No. 610,298. Patented Sept. 6, 1898.
F. E. BALDWIN.
BICYCLE BRAKE.
(Application filed Dec. 6, 1897.)
(Model.)
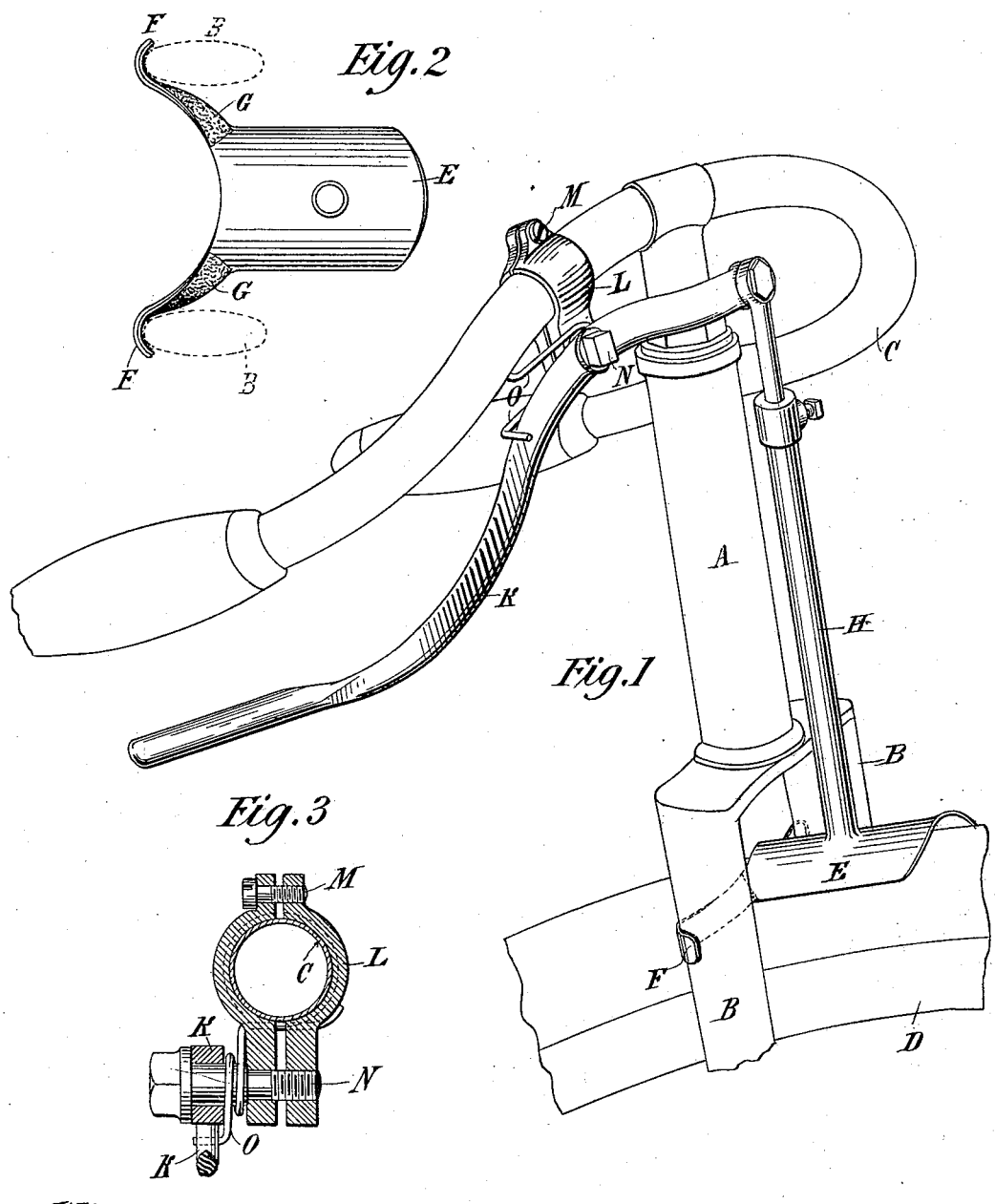

UNITED STATES PATENT OFFICE.

FREDERIC E. BALDWIN, OF NEW YORK, N. Y.

BICYCLE-BRAKE.

SPECIFICATION forming part of Letters Patent No. 610,298, dated September 6, 1898.

Application filed December 6, 1897. Serial No. 660,905. (Model.)

*To all whom it may concern:*

Be it known that I, FREDERIC E. BALDWIN, a citizen of the United States, residing at New York, (New Brighton,) in the county of Richmond and State of New York, have invented certain new and useful Improvements in Bicycle-Brakes, of which the following is a specification, reference being had to the drawings accompanying and forming a part of the same.

The object of the invention which forms the subject of my present application for Letters Patent is to provide a brake which may be readily and easily applied to any bicycle without alteration of the latter or the addition to it of special supports or guides.

Stated in general terms, my improvement consists in a brake for bicycles or the like comprising a shoe which is unattached to the frame of the bicycle except through the brake-rod or the means by which it is forced into or withdrawn from contact with the wheel and provided or formed with extensions in the nature of hooks which engage with the sides or bars of the fork between which the wheel runs or, in general, with a rigid part of the frame when the shoe is depressed and drawn forward by the wheel.

In bicycle-brakes as constructed previous to my invention the brake-rod which carried the shoe either took all the strain due to the drag or pull between the wheel and shoe or the shoe was hinged or pivoted to some part of the frame. This demanded either the use of rods of considerable strength or special provisions for attaching or guiding the rod or shoe, and hence it was often impossible to attach any but a special brake to a bicycle of certain style, and, in fact, no brake of which I am aware has been heretofore produced which is capable of application to bicycles generally without some modifications of or additions to the latter.

The improved brake which I have devised is one which is free from this objection and may be applied directly to any form of bicycle on the market. Its construction and mode of operation will be described by reference to the accompanying drawings.

Figure 1 is a perspective view of the front post and handle-bar of a bicycle with my improved brake attached thereto. Fig. 2 is a plan view of the brake-shoe. Fig. 3 is a section through the point of attachment of the brake-lever to the handle-bar.

While the principle of the improved brake renders it possible to attach the same to different parts of the frame and so that it may be applied to either wheel, it is preferable to attach it in substantially the manner shown, so that it may be applied by means of a simple lever to the front wheel, between or immediately in front of the front fork, as shown in the drawings. In this particular mode of application the invention will be described.

A is the front post of any bicycle; B B, the sides of the fork; C, the usual handle-bar, and D the wheel running between the fork.

The brake consists of a shoe or, as it is usually termed, a "spoon" E. This is or may be of any of the usual forms or patterns; but it is distinguished by having, preferably at its rear end, two lateral extensions F F. These are preferably formed as hooks, which will engage with or embrace the side bars B of the fork.

The surfaces of the hooks and such portions of the shoe as are liable to come in contact with the fork are provided with pads G or generally covered or coated with any material that will prevent the rattling of the shoe when vibrating against the fork.

The principle of the construction of the shoe is such that when it is pressed down upon the wheel it will be drawn tightly against the fork, which takes up the strain due to the drag.

Any suitable means may be employed to depress the shoe; but I prefer to use a simple longitudinally-adjustable brake-rod H, pivoted to a lever K, which may be attached to the handle-bar. As a means of attachment, I employ a split ring or clamp L, which is placed around the handle-bar. This is tightened by a screw M and by the screw-bolt N, which forms a pivot for the lever. The said bolt has a shoulder which abuts against one member of the clamp and a threaded portion of smaller diameter which draws together the two parts of the clamp. The lever is always loose upon the larger portion of the bolt and is acted upon by a spring O, which tends to raise the brake rod and shoe away from the wheel.

In attaching the brake to a bicycle the shoe is tilted and introduced between the sides of the fork, the lever secured to the handle-bar, and the telescoping rod adjusted to the proper length.

Having now described my invention, what I claim is—

1. A bicycle-brake comprising a shoe and means, adapted for attachment to the frame of a bicycle, for operating the brake and constituting its sole support, the shoe being formed or provided with extensions or hooks adapted, when the shoe is forced into contact with the wheel, to be brought into engagement with a rigid part of the frame by the forward movement of the shoe due to the drag or pull of the wheel.

2. The combination in a bicycle-brake of a handle or lever, adapted for attachment to a bicycle-frame, a rod and a shoe attached to and supported solely by the rod, the shoe being formed or provided with extensions or hooks, adapted, when the shoe is forced into contact with the wheel, to be brought into engagement with a rigid part of the frame, by the forward movement of the shoe due to the drag or pull of the wheel.

3. The combination with a bicycle-frame, of a brake-lever attached to the handle-bar, a brake-rod supporting a shoe, which is otherwise unattached to the frame, the said shoe being formed with extensions or hooks that engage with the side bars of the front fork when the shoe is subjected to forward drag or pull, as set forth.

4. The combination with a bicycle-frame, of a brake-lever attached thereto, a brake-rod and a brake-shoe supported thereby and otherwise unattached to the frame, the said shoe being formed or provided with extensions or hooks engaging with the side bars of the front fork and covered or coated with a sound-deadening material, as set forth.

FREDERIC E. BALDWIN.

Witnesses:
M. LAWSON DYER,
G. W. MARTLING.